United States Patent [19]
Hayashi et al.

[11] Patent Number: 5,696,967
[45] Date of Patent: Dec. 9, 1997

[54] LOG DATA MANAGEMENT SYSTEM HAVING A PLURALITY OF PROCESSING UNITS AND A COMMON MEMORY

[75] Inventors: Katsumi Hayashi; Tomohiro Hayashi; Mitsuhiro Ura, all of Kawasaki; Tomoshige Senoo, Hyogo, all of Japan

[73] Assignee: Fujitsu Limited, Kawasaki, Japan

[21] Appl. No.: 208,237

[22] Filed: Mar. 10, 1994

[30] Foreign Application Priority Data

Mar. 11, 1993 [JP] Japan ..................... 5-050924

[51] Int. Cl.[6] ..................................... G06F 17/30
[52] U.S. Cl. ..................... 395/618; 395/182.18
[58] Field of Search ..................... 395/600, 425, 395/575, 616, 618, 620, 182.13, 182.14, 182.17, 182.18; 371/10.1, 13

[56] References Cited

U.S. PATENT DOCUMENTS

| | | | |
|---|---|---|---|
| 4,507,751 | 3/1985 | Gawlick et al. | 395/600 |
| 4,819,159 | 4/1989 | Shipley et al. | 395/575 |
| 4,878,167 | 10/1989 | Kapulka et al. | 395/575 |
| 4,945,474 | 7/1990 | Elliot et al. | 395/575 |
| 5,151,988 | 9/1992 | Yamagishi | 395/600 |
| 5,201,044 | 4/1993 | Frey, Jr. et al. | 395/575 |
| 5,278,982 | 1/1994 | Daniels et al. | 395/600 |
| 5,280,611 | 1/1994 | Mohan et al. | 395/600 |
| 5,327,532 | 7/1994 | Ainsworth et al. | 395/200 |
| 5,333,314 | 7/1994 | Masai et al. | 395/600 |
| 5,369,757 | 11/1994 | Spiro et al. | 395/575 |
| 5,455,947 | 10/1995 | Suzuki et al. | 395/650 |

*Primary Examiner*—Paul V. Kulik
*Attorney, Agent, or Firm*—Armstrong, Westerman, Hattori, McLeland & Naughton

[57] ABSTRACT

A log data management system is used with a database processing system. The log data management system has a plurality of database update units coupled to a database through a common bus. Each of the database update units updates a resource of the database and records log data as an update record. The database update unit writes log data of the resource of the database in a local memory in order of update time of the resource. After the resource has been updated, the database update unit transfers the log data written in the local memory to the common memory. At this time, since the database update unit does not free the resource until the log data is non-volatilized in the common memory, log data are successively stored in the common memory in order of the update time of the resource. When a failure takes place in a resource of the database, log data stored in the common memory are referred to and thereby the resource is quickly closed and recovered.

32 Claims, 12 Drawing Sheets

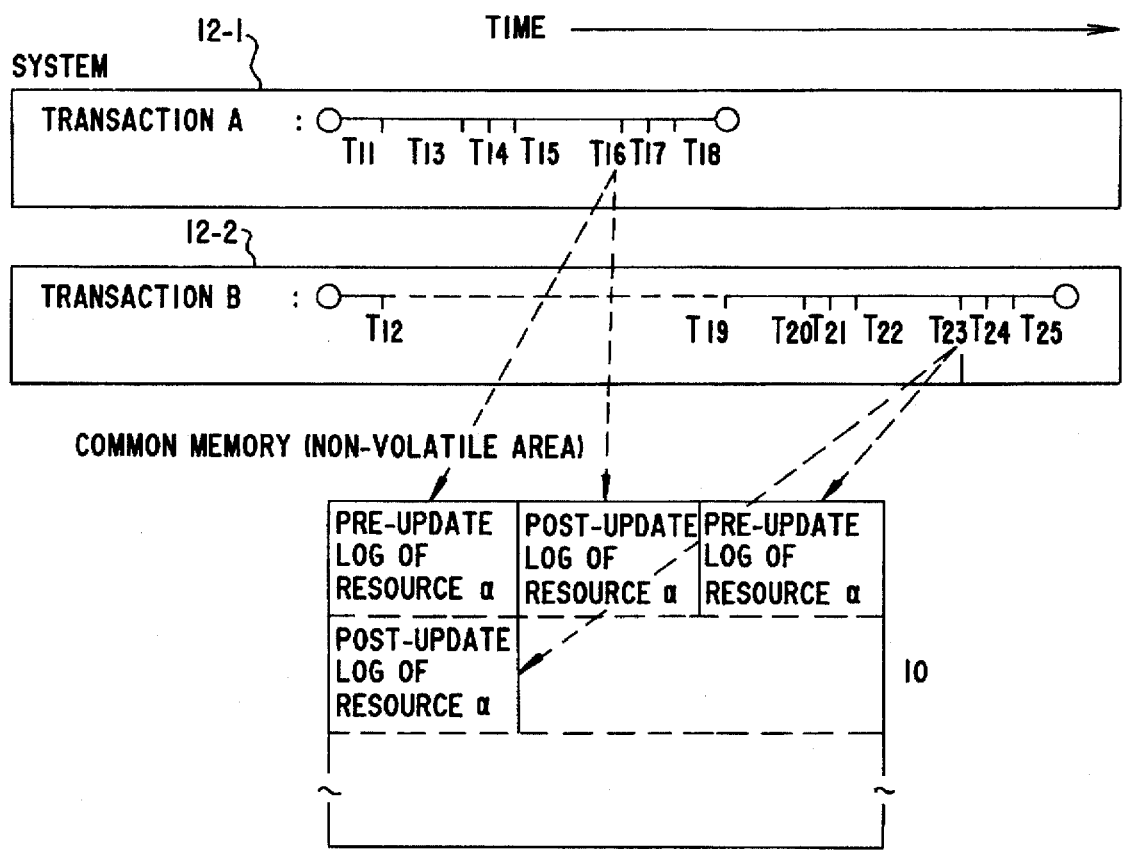

| TRANSACTION A | TRANSACTION B |
|---|---|
| T11 ACQUIRING EXCLUSIVE USE RIGHT OF RESOURCE α | T12 WAITING UNTIL TRANSACTION A DISCARDS EXCLUSIVE USE RIGHT OF RESOURCE α |
| T13 GETTING PRE-UPDATE LOG OF RESOURCE α | T19 ACQUIRING EXCLUSIVE USE RIGHT OF RESOURCE α |
| T14 UPDATE RESOURCE α | T20 GETTING PRE-UPDATE LOG OF RESOURCE α |
| T15 GETTING POST-UPDATE LOG OF RESOURCE α | T21 UPDATING RESOURCE α |
| T16 NON-VOLATILIZING LOG OF RESOURCE α | T22 GETTING POST-UPDATE LOG OF RESOURCE α |
| T17 END OF COMMITMENT OF TRANSACTION A | T23 NON-VOLATILIZING LOG OF RESOURCE (SYNCHRONIZATION) |
| T18 DISCARDING EXCLUSIVE USE RIGHT OF RESOURCE α | T24 END OF COMMITMENT OF TRANSACTION A |
|  | T25 DISCARDING EXCLUSIVE USE |

Fig.7

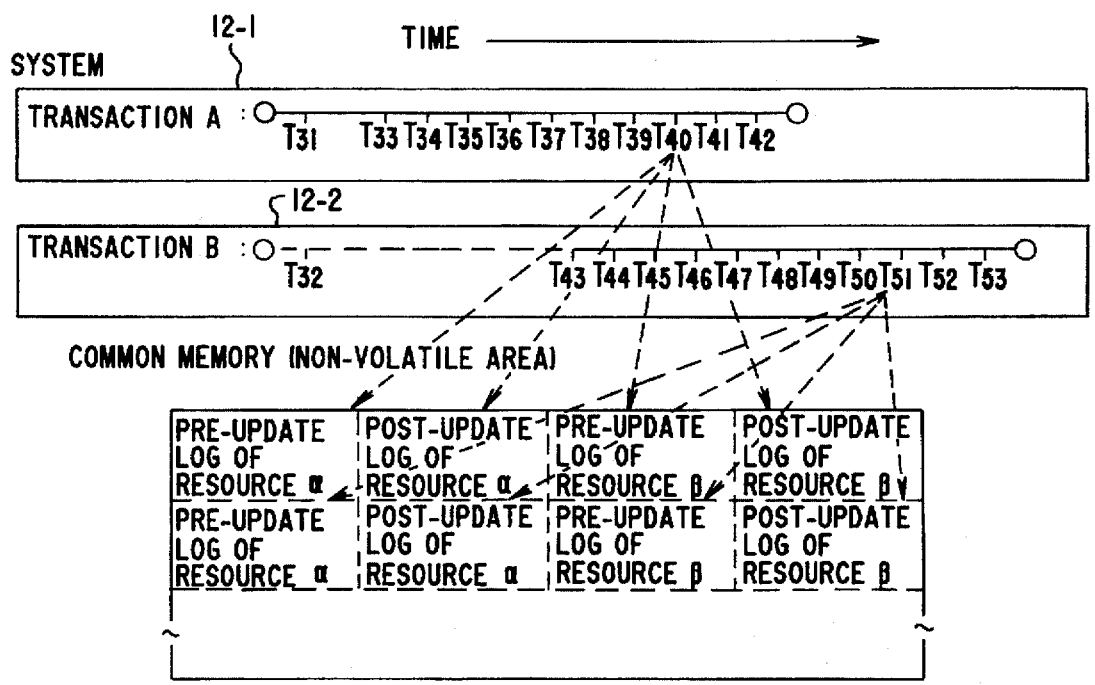

| TRANSACTION A | TRANSACTION B |
|---|---|
| T31 ACQUIRING EXCLUSIVE USE RIGHT OF RESOURCE α | T32 WAITING UNTIL TRANSACTION A DISCARDS EXCLUSIVE USE RIGHT OF RESOURCE α |
| T33 GETTING PRE-UPDATE LOG OF RESOURCE α | T43 ACQUIRING EXCLUSIVE USE RIGHT OF RESOURCE α |
| T34 UPDATING RESOURCE α | T44 GETTING PRE-UPDATE LOG OF RESOURCE α |
| T35 GETTING POST-UPDATE LOG OF RESOURCE α | T45 UPDATING RESOURCE α |
| T36 ACQUIRING EXCLUSIVE USE RIGHT OF RESOURCE β | T46 GETTING POST-UPDATE LOG OF RESOURCE α |
| T37 GETTING PRE-UPDATE LOG OF RESOURCE β | T47 ACQUIRING EXCLUSIVE USE RIGHT OF RESOURCE β |
| T38 UPDATING RESOURCE β | T48 GETTING PRE-UPDATE LOG OF RESOURCE β |
| T39 GETTING POST-UPDATE LOG OF RESOURCE β | T49 UPDATING RESOURCE β |
| T40 NON-VOLATILIZING LOG OF RESOURCES α AND β (SYNCHRONIZATION) | T50 GETTING POST-UPDATE LOG OF RESOURCE β |
| T41 END OF COMMITMENT OF TRANSACTION A | T51 NON-VOLATILIZING LOG OF RESOURCES α AND β (SYNCHRONIZATION) |
| T42 DISCARDING EXCLUSIVE USE RIGHTS OF RESOURCES α AND β | T52 END OF COMMITMENT OF TRANSACTION B |
|  | T53 DISCARDING EXCLUSIVE USE RIGHTS OF RESOURCES α AND β |

| AREA | CONTENT |
|------|---------|
| WS | SYS1 |
| WA | SYS1 |
| WB | 0000 |

COMMON MEMORY

CS1

| AREA | CONTENT |
|------|---------|
| WS | 0000 |
| WA | SYS1 |
| WB | 0000 |

LOCAL MEMORY OF SYSTEM 12-1

LOG DATA MANAGEMENT SYSTEM HAVING A PLURALITY OF PROCESSING UNITS AND A COMMON MEMORY

BACKGROUND OF THE INVENTION

1. Field of the Invention

The present invention relates to a log data management system for use with a database processing system. The log data management system manages log data of a database shared by a plurality of independent systems.

2. Description of the Related Art

While a database processing system with a database that is shared by a plurality of independent systems is operating, if a failure takes place in a resource of the database, log data that has been recorded as an update record in a non-volatile area is required.

Conventionally, log data is recorded as a system log file in a non-volatile area in each independent system. When a failure takes place in a resource of the database, as shown in FIG. 1, the database system refers to the log files of all the systems and sorts the log data by update time of the resource so as to recover the defective resource.

FIG. 1 shows a block diagram of a related art.

In a log data recording phase, transactions that take place in systems 1, 2, and 3 cause a system 1 log file 5-1, a system 2 log file 5-2, and a system 3 log file 5-3 that are non-volatile storage areas to store log data of a resource of the database 7 when they update the resource, respectively.

In FIG. 1, "LOG at time T1" in the system 1 log file 5-1 is log data that a transaction 4-1 has recorded at time T1. "LOG at time T7" is log data that a transaction 4-5 has recorded at time T7. Likewise, other log data in the system 2 log file 5-2 and the system 3 log file 5-3 are recorded by corresponding transactions.

In a defective resource recovering phase, if any failure takes place while the systems 1, 2, and 3 are processing the database, the database processing system gets the log data from the log files 5-1, 5-2, and 5-3 of the systems 1, 2, and 3, sorts the log data by update time (logical transaction sequence) of the database 7, and stores the sorted log data in a working area 6. The database processing system refers to the sorted log data so as to recover the defective resource of the database 7.

The following related art references are known as log data management technology for use with database processing systems in which a database is shared by a plurality of independent systems.

Database Update Log Processing System (Japanese Patent Laid-Open Publication No. 61-133450). In this system, update log history files are categorized for each resource of database and shared by a plurality of processors. Individual update log history files are segmented and each processor has a fixed log storing position in the update log history files.

Journal Retrieving System (Japanese Patent Laid-Open Publication No. 3-202950).

In this system, log data of each processor is sent to a mini-computer (namely, a back-end processor or BEP) in a lump. The mini-computer merges the log data of the common database and stores the merged log data in a common log file.

In the conventional database processing system as shown in FIG. 1, if a failure takes place in a resource of a database, the system sorts log data by update time of the database and refers to the sorted log data so as to recover the defective resource. Thus, if the data amount of the database is huge, it takes a long time to sort the log data. In other words, it takes a long time to find out a defective resource, close it, perform a fall-back operation, and recover the defective resource.

In the database update log processing system (Japanese Patent Laid-Open Publication No. 61-133450), since each processor has a dedicated segment in an update log history file corresponding to a resource group, the processor outputs log data to its dedicated segment area. Thus, when the database processing system recovers the defective resource, the log data should be sorted.

In the journal retrieving system (Japanese Patent Laid-Open Publication No. 3-202950), a processor outputting log data is restricted to a mini-computer (BEP). Thus, if the mini-computer malfunctions, the log data cannot be output. In other words, in this system, the reliability of the system is not high.

SUMMARY OF THE INVENTION

An object of the present invention is to store log data in the order of update time of the database in a common memory shared by a plurality of systems when the log data occur, and to refer to the sorted data upon occurrences of failures so as to quickly close defective resources and recover them.

Another object of the present invention is to compress a plurality of log data read into memories in a plurality of systems so as to enhance the efficiency of the storage space of log data storage areas.

The present invention is a log data management system for use with a database processing system that has a plurality of database update units each of which is loosely coupled through a common bus or the like. Each of the database update units accesses a database, updates a resource of the database, and writes log data of an update record of the resource into its local memory.

A log data management system according to a first aspect of the present invention has a non-volatile common memory coupled to a plurality of database update units.

Each of the database update units has a processor and a local memory. The processor performs various processes. The database update unit writes log data (before image log and after image log) of a resource of the database in a local memory in the order of update time of the resource when updating the resource. After the resource has been updated, the database update unit performs a log data transferring process for transferring log data written in the local memory to the common memory. At this time, the database update unit does not allow the other database update units to use the resource until the log data is recorded in the common memory and non-volatilized if the consistency of the data may be impaired in a data transaction between the database update units.

Log data transferred from the database update units are recorded in a lump in the common memory in the order of update time of the resource. Whenever the resource is updated, corresponding log data is recorded in the common memory. Thus, when a failure takes place, all log data have been recorded in the order of update time of the data base. In other words, with reference to the log data recorded in the common memory, a defective resource can be quickly closed and recovered.

A log data management system according to a second aspect of the present invention comprises a volatile common memory and a non-volatile log storing device that are coupled to a plurality of database update units. Each of the database update units has a processor and a local memory. The processor performs various processes.

The database update unit writes log data (before image log and after image log) of a resource of the database in the local memory in the order of update time of the resource when updating the resource. After the resource has been updated, the database update unit performs a log data transferring process for transferring the log data written in the local memory to the common memory. The common memory buffers the log data transferred from the database update units to compress them in the order of update time of the resource and stores the log data in a lump. With the log data transferring process, the database update unit transfers the compressed log data to the log storing device. The log storing device non-volatilizes the log data.

At this time, the database update unit does not allow the other database update units to use the resource until the log data is non-volatilized if the consistency of the data may be impaired in a data transaction between the database update units.

With this construction, log data gotten by database update units are buffered, and stored in a volatile area. Since log data are concentratedly blocked in a volatile area, they can be compressed. Thus, the space efficiency of the non-volatile log data storing device is improved.

When a failure takes place, since all log data have been stored in the log data storing device in the order of update time of the database, with reference to the log data, the defective resource can be quickly closed and recovered.

In the first aspect of the log data management system, as in the second aspect, log data are blocked and compressed in a non-volatile common memory.

In the log data management system according to the present invention, a plurality of transactions that take place in each of the database update unit may update the resource of the database and record log data as an update record.

In this case, each transaction performs an exclusion control process so as to acquire an exclusive use right of the resource to be updated if the consistency of the data may be impaired in data transactions. After the log data has been recorded in the non-volatile common memory or the log storing device, the transaction discards the exclusive use right of the resource. Then, another transaction can acquire the exclusive use right of the resource. Consequently, a plurality of log data gotten by a plurality of transactions can be recorded in the common memory or the log storing device in the order of update time of the resource.

These and other objects, features and advantages of the present invention will become more apparent in light of the following detailed description of a best mode embodiment thereof, as illustrated in the accompanying drawings.

BRIEF DESCRIPTION OF THE DRAWINGS

One skilled in the art can easily understand additional features and objects of this invention from the description of the preferred embodiments and some of the attached drawings. In the drawings:

FIG. 7 is a diagram for explaining a log data recording operation of a log data management system that updates the same resource according to the present invention;

FIG. 8 is a diagram for explaining a log data recording operation of a log data management system that updates a plurality of resources according to the present invention;

FIG. 11 is a diagram showing a cancellation of a use declaration to the common memory according to the present invention.

DESCRIPTION OF PREFERRED EMBODIMENTS

Next, with reference to the accompanying drawings, embodiments of the present invention will be described.

Figure 1:
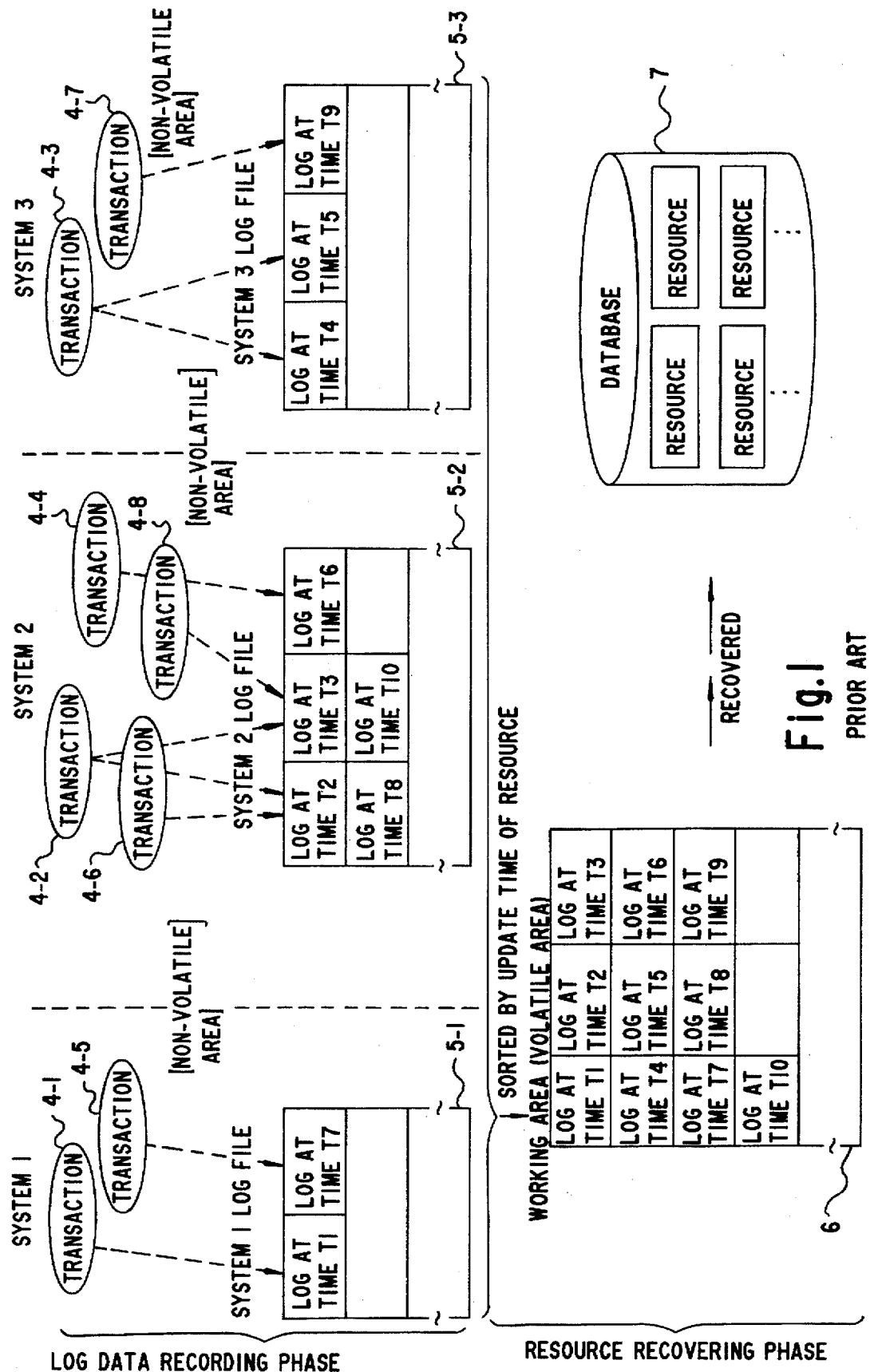
FIG. 1 is a diagram for explaining a log data getting method of a related art.
Figure 2:
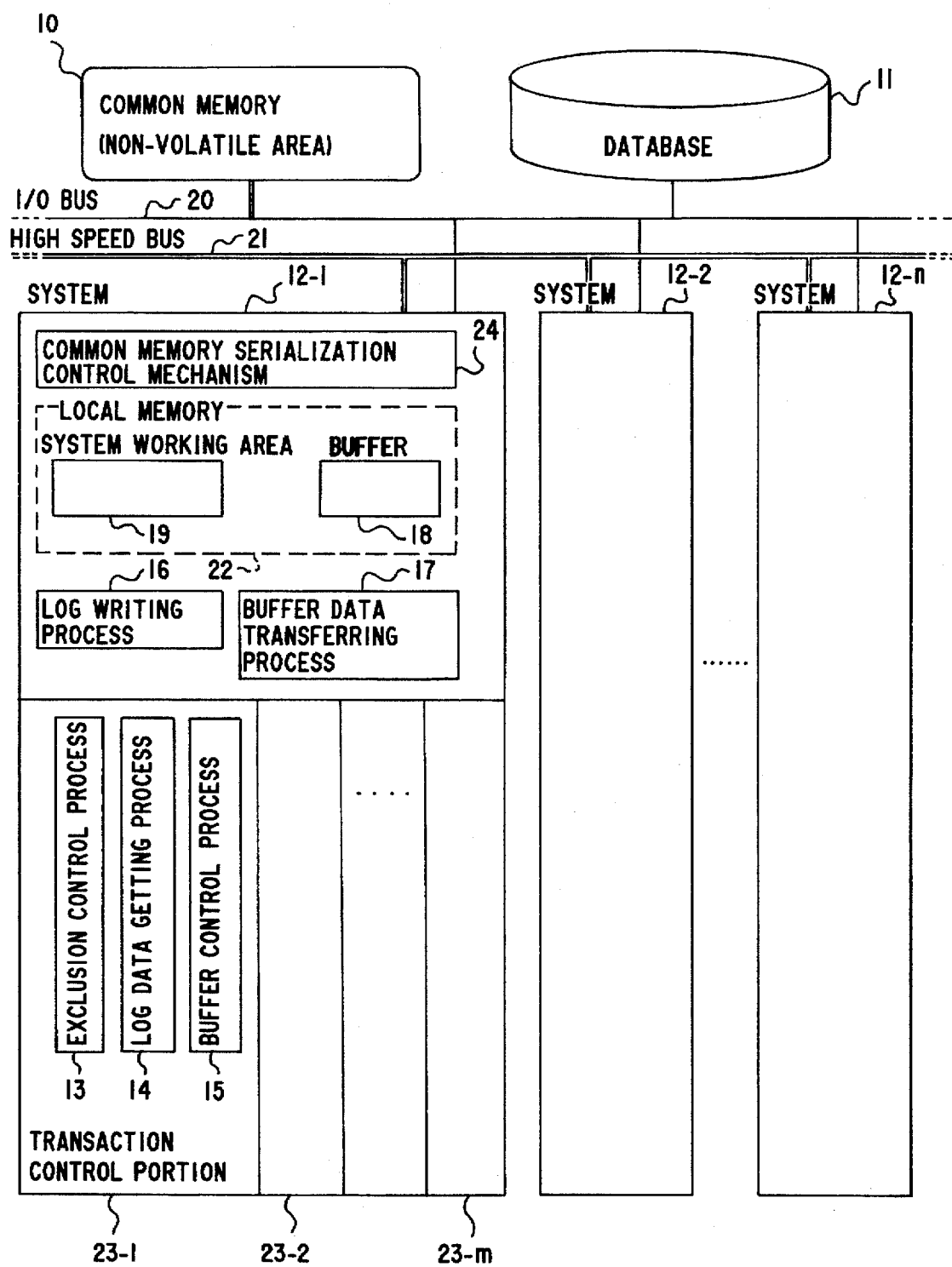
FIG. 2 is a diagram showing a construction of an embodiment of the present invention.
Figure 3:
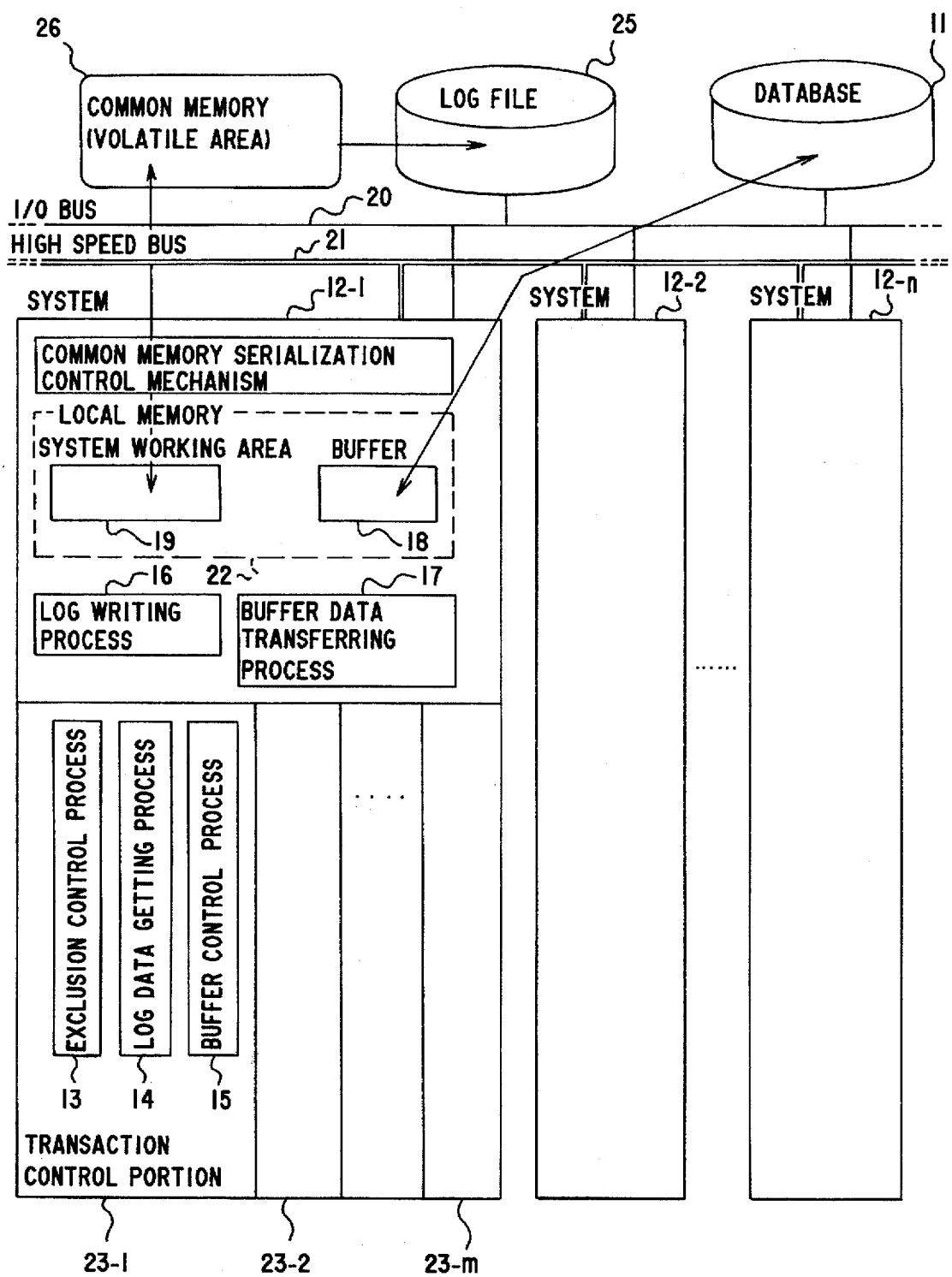
FIG. 3 is a diagram showing a construction of another embodiment of the present invention.

FIGS. 2 and 3 show respective construction of log data management systems according to embodiments of the present invention.

In FIGS. 2 and 3, common memories 10 and 26 are memories that store log data and that are shared by a plurality of independent systems 12-1 to 12-n. The common memory 10 is disposed at a non-volatile area. On the other hand, the common memory 26 is disposed in a volatile area. When the common memory 26 is disposed in a volatile area, a non-volatile log file 25 that is shared by the systems 12-1 to 12-n is provided.

A database 11 is connected to the systems 12-1 to 12-n through an I/O bus 20. The common memories 10 and 26 are connected to the systems 12-1 to 12-n through a high speed bus 21. Each of the systems 12-1 to 12-n has a common memory serialization control mechanism 24 to access the common memory 10 or 26.

In FIGS. 2 and 3, two buses are provided, that is, the I/O bus 20 and the high speed bus 21. These buses can be integrated into a single common bus. A log data getting process 14 in a transaction control portion 23-1 gets log data and writes them in a system working area 19 when a transaction that works in each system updates the database 11.

A log writing process 16 writes log data of a transaction to a nonvolatile area.

As shown in FIGS. 2 and 3, the present invention has a symmetrical construction where a plurality of independent systems share a common memory.

In the embodiment shown in FIG. 2, when a transaction updates the database 11, the log data getting process 14 gets post-update log. data of the database 11 and writes them in the system working area 19. The log writing process writes out log data in the order of update time of the database by transactions to the non-volatile common memory 10 through the high. speed bus 21. In the embodiment shown in FIG. 3, the log writing process 16 writes out log data in the order of update time of the database to the volatile common memory 26. To improve the efficiency of the storage space, log data from the independent systems are buffered in the common memory 10 or 26.

The log writing process 16, the buffer data transferring process 17, the exclusion control process 13, the log data getting process 14, and the buffer control process 15 (the processes 13, 14, and 15 are contained in the transaction control portion) are performed by, for example, a processor provided in the system 12-1. This applies to other independent systems 12-2 to 12-n.

Thus, since log data of all the independent systems are sorted by update time of the database and written to the common memory 10 or 26, which is, shared by these independent systems, the conventional log merging process is not required. When a failure takes place, as with TCMP (tightly-coupled mini-processor), the log data management system refers to the sorted log data so as to close the database 11 and recover the defective resource.

In addition, since a symmetrical system construction is employed, the log data management system is strong enough against an individual system defect. Moreover, a minicomputer (BEP) that gets log data is not required. Thus, the construction of the log data management system becomes simple. Next, with reference to FIGS. 2 to 8, the construction and operation of the embodiment of the present invention will be described.

In FIG. 2, the common memory 10 is shared by the systems t2-1, 12-2, . . . , and 12-n. The common memory 10 stores log data in the order of update time of the database 11.

The database 11 stores various data so that they can be easily read and updated. The systems 12-1, 12-2, . . . , and 12-n refers to and update the database 11 so as to perform various processes. A local memory 22 has storage areas for use with transactions and the system 12-1.

The exclusion control process 13 acquires an exclusive use right of a part of the related portion of the database 11 as well-known transaction exclusive control methods.

The log data getting process 14 gets log data of the database 11 updated by transactions in the order of update time of the database 11 and stores the log data in the system working area 19.

The buffer control process 15 writes data in a buffer 18.

When the log data written in the system working area 19 exceeds a predetermined amount, the log writing process 16 gets the log data out of the system working area 19 and records them in the common memory 10. A group commit of plural transactions performed in a single system is achieved when the log data of the plural transactions performed in the single system is transferred from the system working area 19 to the common memory 10 in a lump.

The log data received from a plurality of systems are individually added at the end and buffered in the common memory 10.

The buffer data transferring process 17 transfers data stored in the buffer 18 to the database 11.

The buffer 18 is a storage area that temporarily stores data.

The system working area 19 temporarily stores various data. In this embodiment, the system working area temporarily stores log data.

In FIG. 3, when log data stored in the system working area 19 exceeds a.predetermined amount, the log writing process 16 reads the log data out of the system working area 19 and stores the log data in the common memory 26. The log data received from a plurality of-systems are added at the end and buffered in the common memory 26 so as to improve the efficiency of the storage.space. Then, the log data can be made to be non-volatile in the log file, thereby achieving a group commit of plural transactions performed in a plurality of systems when the log data of the plural transactions performed in the plurality of systems are transferred from the common memory 26 to the log file 25 in a lump. The resultant log data is recorded in the non-volatile log file 25.

Next, according to a flow chart shown in FIG. 4, the operations of the embodiments shown in FIGS. 2 and 3 will be described.

Figure 4:
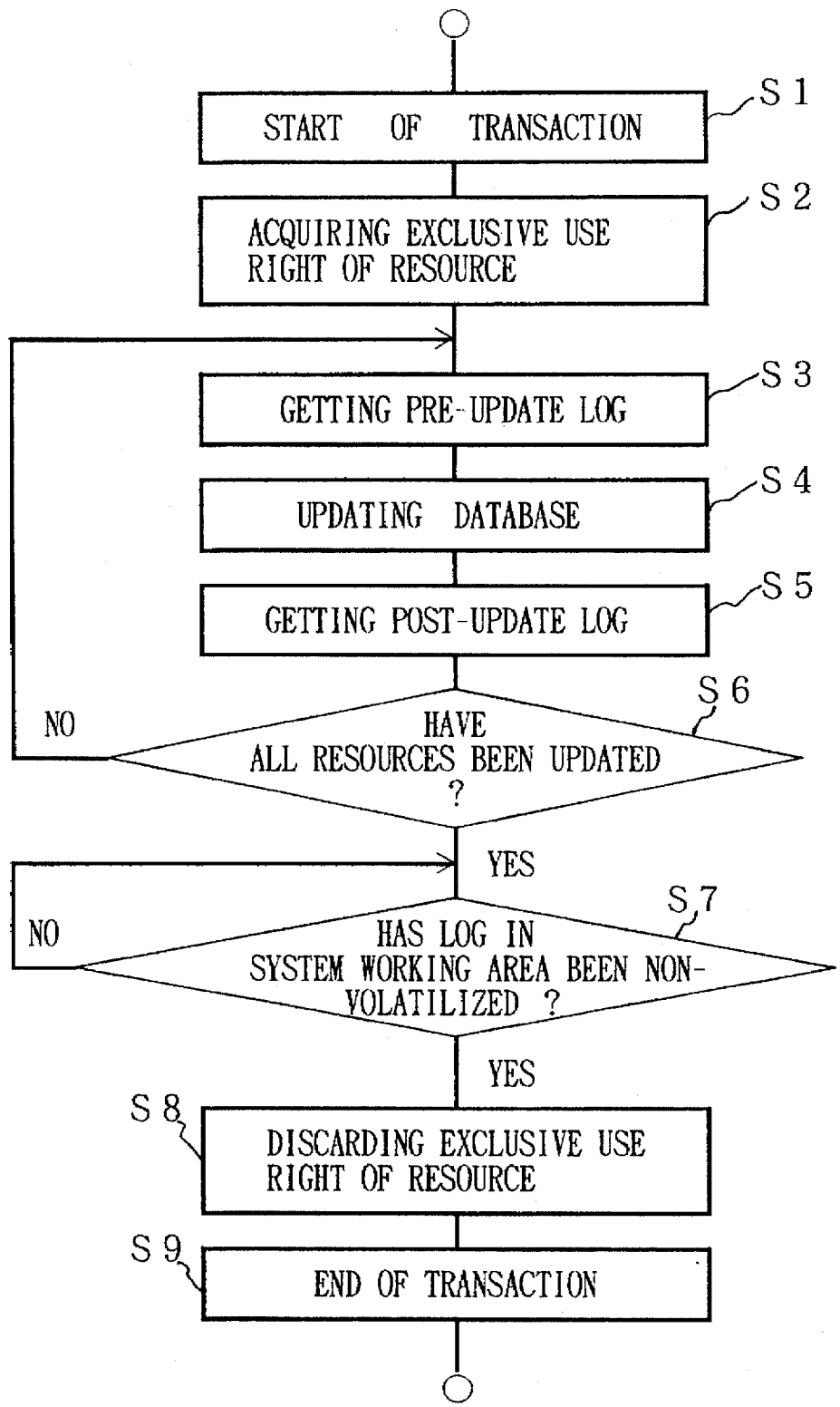
FIG. 4 is a flow chart showing a transaction process according to the present invention.

FIG. 4 is a flow chart showing a transaction process that is performed in each-independent system.

A transaction is started at step S1.

The transaction acquires an exclusive use right of a resource of the database 11 at step S2 (exclusion acquisition). In other words, the exclusion control process 13 shown in FIGS. 2 and 3 acquires the exclusive use right of the resource of the database 11 to be updated.

The transaction writes pre-update log data (before image log or undo log) in the system working area 19 at step S3. At this time, the transaction gets the pre-update log data, which is a log data before updating the resource of database 11, by the log data getting process 14.

The transaction updates the resource of the database 11 stored in the buffer 18 at step S4.

With the log data getting process 14, the transaction writes post-update log data (after image log or redo log), which is a log data after updating the resource of the database 11, and stores it in the system working area 19 at step S5.

The transaction determines whether or not all the resources have been updated on the buffer 18 at step S6. When the determined result is YES, the transaction performs a process at step S7. When the determined result is NO, the transaction repeats processes from step S3.

The transaction determines whether or not the log data in the system working area 19 has been non-volatilized at step S7. When the determined result is YES, since the log data in the system working area 19 has been non-volatilized in the common memory 10 or the log file 25. The transaction discards the exclusive use right of the resource of the database 11 at step S8. The transaction is completed at step S9. When the determined result at step S7 is NO, the transaction waits until the log data in the system working area 19 is non-volatilized. The log writing process 16 stores the log data in the common memory 10 or the log file 25 in the order of update time of the database 11 when nonvolatilizing the log data.

The common memory serialization control mechanism 24 causes a plurality of systems to sequentially access the common memory 10 or 26. For example, a system that has acquired an exclusive use right for the common memory 10 or 26 at first can access the common memory 10 or 26. After this system has discarded the exclusive use right, another system can acquire the exclusive use right for the common memory 10 or 26, and so on. In this method, each system writes a use declaration into the common memory 10 or 26, for example. The use declaration has a data length that can uniquely represent which system is using the common memory 10 or 26. When a particular system writes a use declaration to the common memory 10 or 26, other systems cannot use the common memory 10 or 26 until is discards the use declaration.

An order of writing the log data is determined by the acquisition of the exclusive use right of the resource of the database 11 regardless of this serialization of accesses to the common memory. In other words, log data to be written to the common memory 10 or 26 cannot take place, unless the exclusive use right of the database 11 is acquired.

Thus, it is guaranteed that log data of the same resource is written to the common memory in the order of completion of transactions. According to the present invention, the database 11 and log data are shared by a plurality of independent systems. Thus, as with TCMP, log data can be treated and used consistently also in a composite system.

Thus, when a transaction is started, an exclusive use right of a resource of the database 11 is acquired. When the database 11 is updated, pre-update log data of the database 11 and post-update log data of the database 11 are recorded. The log data are non-volatilized in the common memory 10 or the log file 25, which are shared by the systems, in the order of update time of the database 11. Thereafter, the exclusive use right is discarded and the transaction is completed. Consequently, even if a failure takes place in a resource of the database 11, since the common memory 10 or the log file 25 has recorded the log data recorded by update time of the database 11, with reference to the sorted log data, a defective resource can be quickly closed and recovered.

Figure 5:
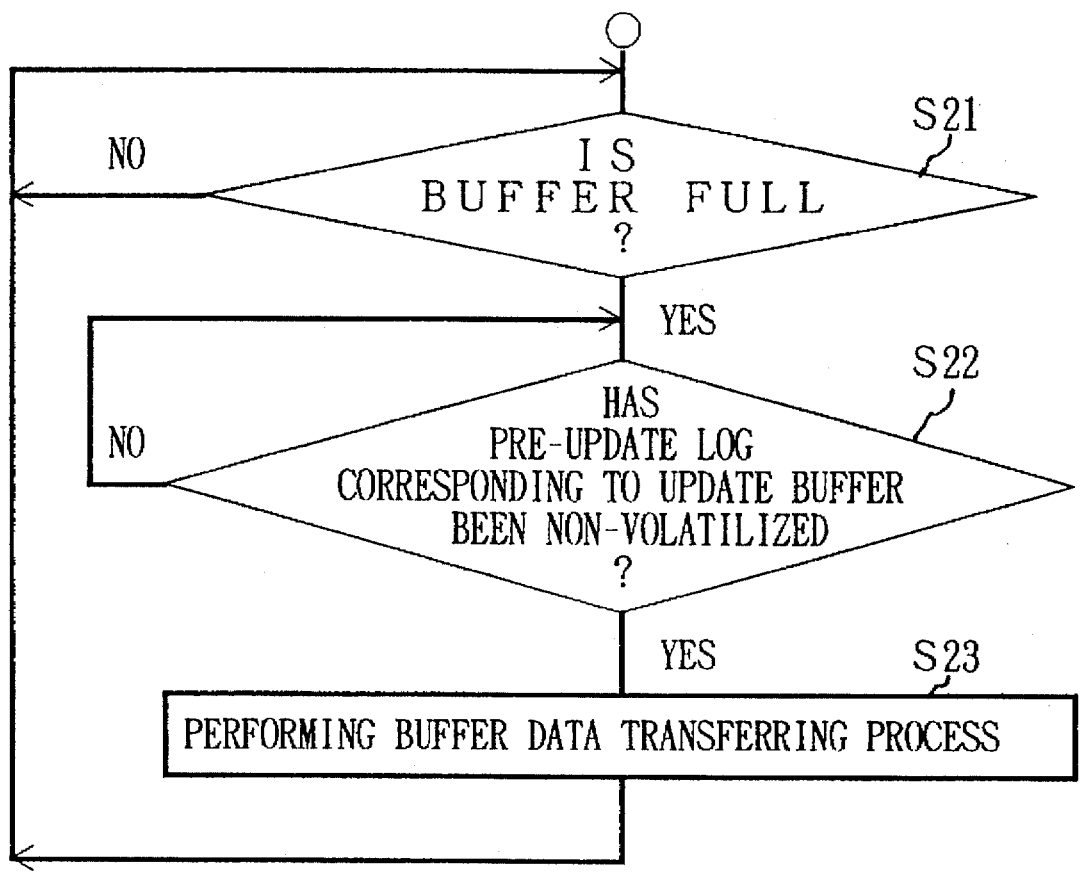
FIG. 5 is a flow chart showing a buffer data transferring process.

FIG. 5 is a flow chart showing a buffer data transferring process 17 that is a system resident demon.

In FIG. 5, the buffer data transferring process 17 determines whether or not the buffer 18 in FIG. 2 and FIG. 3 is full at step S21, for example. When the determined result is YES, the buffer data transferring process 17 determines whether or not pre-update log data of the database 11 has been non-volatilized in the common memory 10 in the log file 25 at step When the determined result is YES at step S22, the buffer data transferring process 17 transfers data stored in the buffer 18 back to the database 11 at step S23 and returns to the process at step S21. On the other hand, when the determined result is NO at step S22, the buffer data transferring process 17 waits until the log data is non-volatilized in the common memory 10 or the log file 25.

Figure 6:
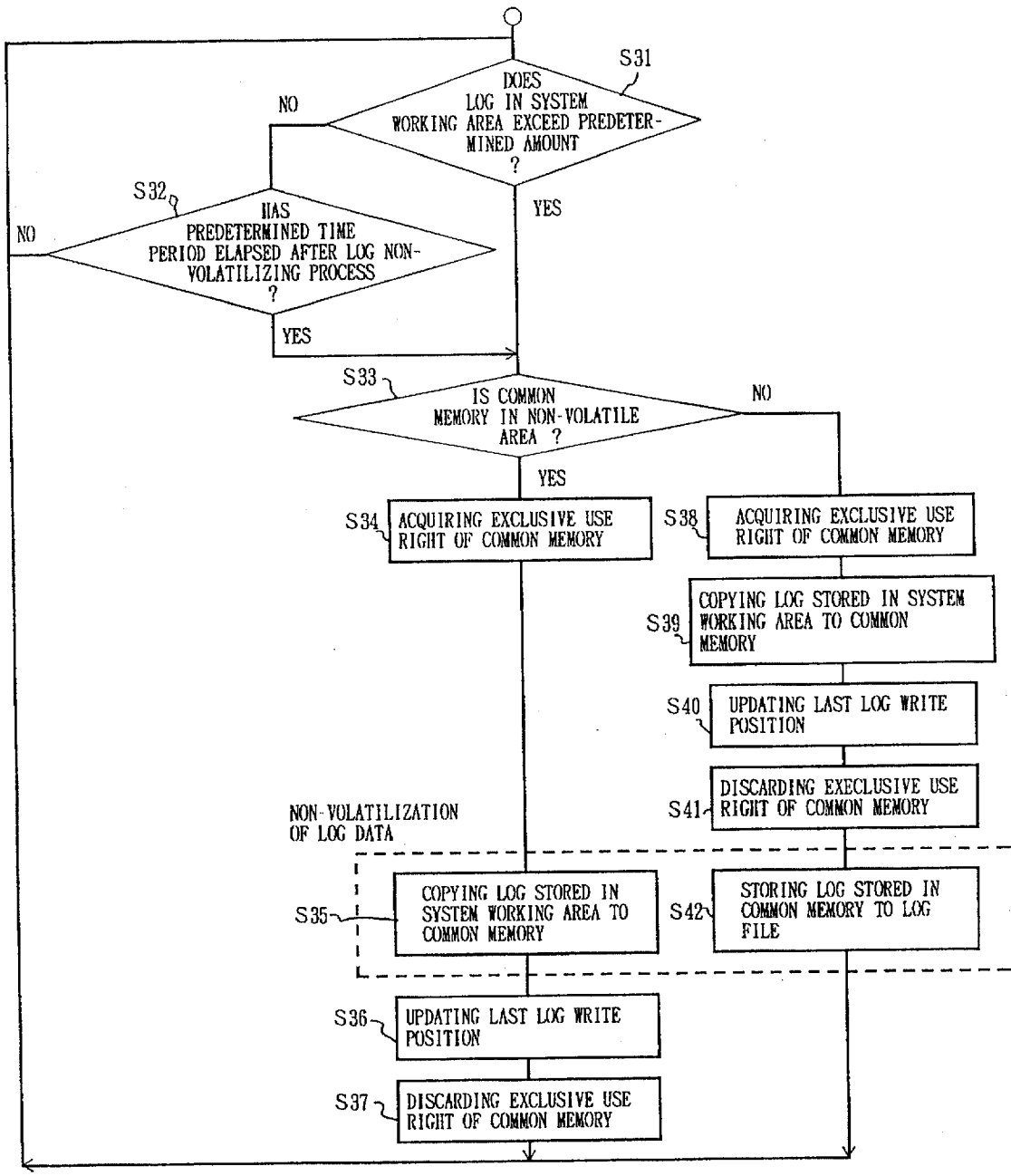
FIG. 6 is a flow chart showing a log writing process accoding to the present invention.

FIG. 6 is a flow chart showing the log writing process 16 that is a system resident demon. The log writing process 16 determines whether or not log data stored in the system working area 19 exceeds a predetermined amount at step S31. When the determined result is YES, the log writing process 16 performs a process at step S33. When the determined result is NO, the log writing process 16 determines at step S32 whether or not a predetermined time period has elapsed after the log data in the system working area 19 was previously written out to a non-volatile area. The determination process at step S32 may determine whether or not a non-volatilizing request by the process at step S7 (FIG. 4) or step S22 (FIG. 5) has taken place. When the determined result at step S32 is YES, the log writing process 16 performs a process at step S33. When the determined result at step S32 is NO, the log writing process 16 returns to the process at step S31.

The log writing process 16 determines whether or not the common memory 10 has been disposed at a nonvolatile area at step S33. When the determined result is YES, the log writing process 16 perform a process at step S34. When the determined result is NO, the log writing process 16 performs a process at step S38.

The log writing process 16 acquires an exclusive use right of the common memory 10, which is shared by the systems, at step S34. For example, each system writes a use declaration into the common memory 10. When a system wants to write a use declaration to the common memory 10, if another system has already written a use declaration to the common memory 10, the former system should wait until the latter system discards the use declaration.

The log writing process 16 refers to the last log write position recorded in the common memory 10 at step S35 and copies log data in the system working area 19 to the next position to the last position in the common memory 10 by a required amount. Thus, log data plural systems are grouped into blocks in the order of end time of the transactions.

The log writing process 16 updates the last log write position in the common memory 10 at step S36.

The log writing process 16 discards the exclusive use right of the common memory 10 at step S37. Thereafter, the log writing process 16 returns to the process at step S31.

The log writing process 16 acquires an exclusive use right of the common memory 26 at step S38. For example, as at step S34, each system writes a use declaration to the common memory 26. When a system wants to write a use declaration to the common memory 26, if another system has already written a use declaration to the common memory 26, the former system should wait until the latter. system discards the use declaration.

The log writing process 16 refers to the last log write position of the common memory 10 at step S35 and copies log data stored in the system working area 19 to the next position to the last position to in the common memory 26 by a required amount. Thus, log data of the plural systems are-buffered in the order of end time of transactions.

The log writing process 16 updates the last log write position in the common memory 26 at step S40.

The log writing process 16 discards the exclusive use right of the common memory 26 at step S41.

The log writing process 16 stores the log data buffered in the common memory 26 into the log file 25 and then returns to the process at step S31.

FIG. 7 is a schematic diagram for explaining a log data recording operation of the log data getting system in FIG. 2. In this drawing, transactions A and B take place in systems 12-1 and 12-2, respectively. These transactions 12-1 and 12-2 update a resource α of the database 11. Thus, the transactions 12-1 and 12-2 record log data to the non-volatile common memory 10 in the order of update time of the database.

First, the operation of the transaction A will be described.

The transaction A acquires an exclusive use right of the resource α of the database 11 at time T11.

The transaction A gets pre-update log data of the resource α at time T13.

The transaction A updates the resource a at time T14.

The transaction A gets post-update log data of the resource α at time T15.

The transaction A waits until the log writing process 16 completes non-volatilization of the log data of the resource α, and synchronizes commit process with non-volatilization at time T16. At this time, the log writing process 16 stores both the pre-update log data of the resource α and the post-update log data of the resource α as represented by arrows and dotted lines in FIG. 7.

When the log data have been non-volatilized at time T17, the transaction A completes the commit process.

The transaction A discards the exclusive use right of the resource α at time T18.

Next, the operation of the transaction B will be described.

Since the other transaction (namely, the transaction A) has acquired the exclusive use right of the resource α of the database 11 at time T12, the transaction B waits until the other transaction discards the exclusive use right.

When the transaction A discards the exclusive use right at time T18, the transaction B acquires the exclusive use right of the resource α of the database 11 at time T19.

The transaction B gets pre-update log data of the resource α at time T20.

The transaction B updates the resource α at time T21.

The transaction B gets post-update log data of the resource α at time T22.

The transaction B waits until the log data of the resource α has been non-volatilized at time T23. At this time, both the pre-update log data of the resource α and the post-update log data of the resource α are stored in the common memory 10 as represented by arrows and dotted lines in FIG. 7.

When the log data have been non-volatilized at time T24, the transaction B completes a commit process at time T24.

The transaction B discards the exclusive use right of the resource α at time T25.

Thus, log data of the same resource α of the database 11 are stored in the common memory 10 in the order of end time of the transactions A and B.

Although the transactions A and B update data stored in the buffer 18, when the buffer 18 becomes full, the buffer data transferring process 17 transfers the updated data to the database 11. However, if the system goes down before a transaction in execution completes the commit process, the resource α of the database 11 should be restored to a condition before the transaction has started. In this case, with the pre-update log data of the resource α which have been non-volatilized in the common memory 10, the database 11 is recovered.

When a resource is recovered in a system-down situation, log data of a transaction in execution in the system-down situation is used. For example, when the system goes down before the transaction B is completed, the database 11 is recovered to the previous condition with the pre-update log data of the resource α non-volatilized at time T23.

Next, with reference to FIG. 8, a log data getting operation in the case that each of two transactions updates two resources will be described. In FIG. 8, the transactions A and B of the systems 12-1 and 12-2, respectively, update resources α and β and store respective log data in the common memory 10 in the order of update time of the database 11.

First, the operation of the transaction A will be described.

The transaction A acquires an exclusive use right of the resource α of the database 11 at time T31. The transaction A gets pre-update log data of the resource α at time T33. The transaction A updates the resource α at time T34. The transaction A gets post-update log data of the resource α at time T35.

The transaction A acquires an exclusive use right of the resource β of the database 11 at time T36. The transaction A gets pre-update log data of the resource β at time T37. The transaction A updates the resource β at time T38. The transaction A gets post-update log data of the resource β at time T39.

The transaction A waits until the log writing process 16 non-volatilizes the log data at time T40 and synchronizes a commit process with nonvoAt tlization. At this time, the log writing process 16 stores the pre-update log data of the resource a, the post-update log data of the resource α, the preupdate log data of the resource β, and the post-update log data of the resource β in the common memory 10 as represented by arrows and dotted lines in FIG. 8.

The transaction A completes the commit process at time T41. The transaction A discards the exclusive use rights of the resources α and β at time T42.

Next, the operation of the transaction B will be described.

Since the transaction A has acquired the exclusive use right of the resource α at time T31, the transaction B waits until the transaction A discards the exclusive use right of the resource α at time T32.

After the transaction A discarded the exclusive use rights of the resources α and β at time T42, the transaction B acquires an exclusive use right of the resource α at time T43. The transaction B gets preupdate log data of the resource α at time T44. The transaction B updates the resource α at time T45. The transaction B gets post-update log data of the resource α at time T46.

The transaction B acquires an exclusive use right of the resource β at time T47. The transaction B gets pre-update log data of the resource β at time T48. The transaction B updates the resource β at time T49. The transaction B gets post-update log data of the resource β at time T50.

The transaction B waits until the log writing process non-volatilizes the log data at time T51 and synchronizes a commit process with non-volatilization. At this time, the log writing process 16 stores the pre-update log data of the resource α, the post-update log data of the resource α, the pre-update log data of the resource β, and the post-update log data of the resource β in the common memory 10 as represented by arrows and dashed lines in FIG. 8.

The transaction B completes the commit process at time T52. The transaction B discards the exclusive use rights of the resource α and the resource β at time T53.

Thus, when transactions update a plurality of resources, log data thereof are stored in the common memory 10 in the order of update time of the resource.

To recover a particular defective resource with log data stored in the common memory 10, the log data stored in the common memory 10 are gotten successively from the beginning. The log data of resources other than the defective resource are ignored. Only the log data of the defective resource are read out. In this manner, the log data of the defective resource are retrieved in the order of its update time. Alternatively, before recovering a defective resource, log data may be stored in the common memory 10 so that they are grouped, resource by resource.

In the embodiments shown in FIGS. 7 and 8, the log data management system shown in FIG. 2 was described. Also in the case of the log data management system shown in FIG. 3, in the same manner shown in FIGS. 7 and 8, log data are recorded in the order of update time of database resources in the log file 25. At this time, the log writing process 16 temporarily stores and buffers the log data in the common memory 26 and then stores them in the log file 25.

Next, with reference to FIGS. 9 to 12, an embodiment of a common memory serialization control mechanism 24 for use with each independent system will be described.

The common memory serialization control mechanism 24 shown in FIGS. 2 and 3 has, for example, a processor that executes a hardware instruction for controlling an access to the common memory 10 or 26. In this embodiment, the control hardware instruction is a "compare and swap instruction (CSI)" that completely performs steps of a logical flow shown in FIG. 9 at a time.

The CSI compares control data WS stored in one word area in the common memory 10 or 26 with control data WA stored in one word area in the local memory 22 at step S51.

When the control data WS matches with the control data WA, the CSI writes control data WB stored in another one word area of the local memory 22 into the area of the control data WS at step S52. The CSI returns value 0 at step S53.

When the control data WS does not match with the control data WA at step S51, the CSI reads the control data WS and writes it into the area of the control data WA at step S54. In this case, the CSI returns a value other than 0 at step S55.

Figure 9:
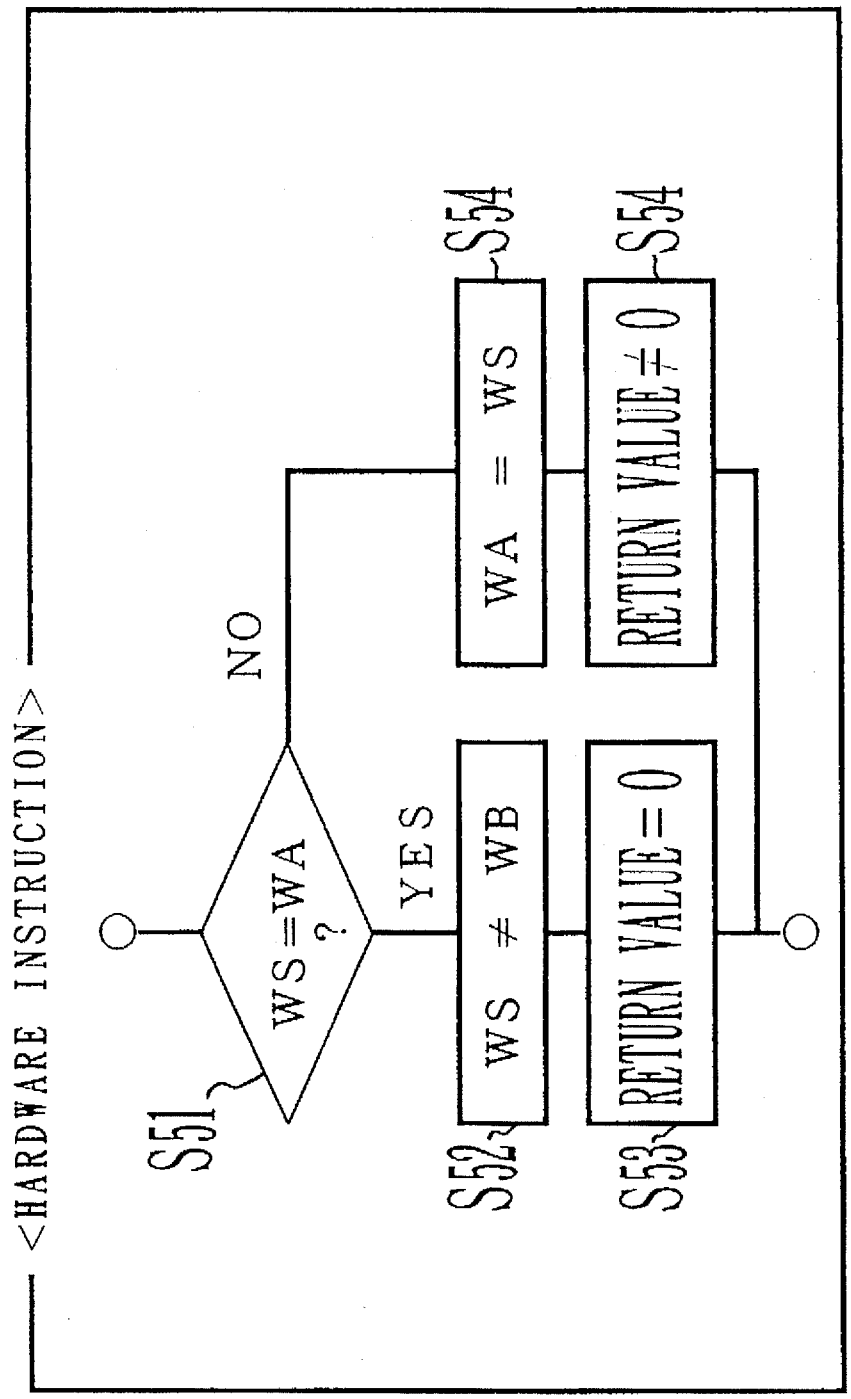
FIG. 9 is a flow chart showing a logic of a hardware instruction according to the present invention.
Figure 10:
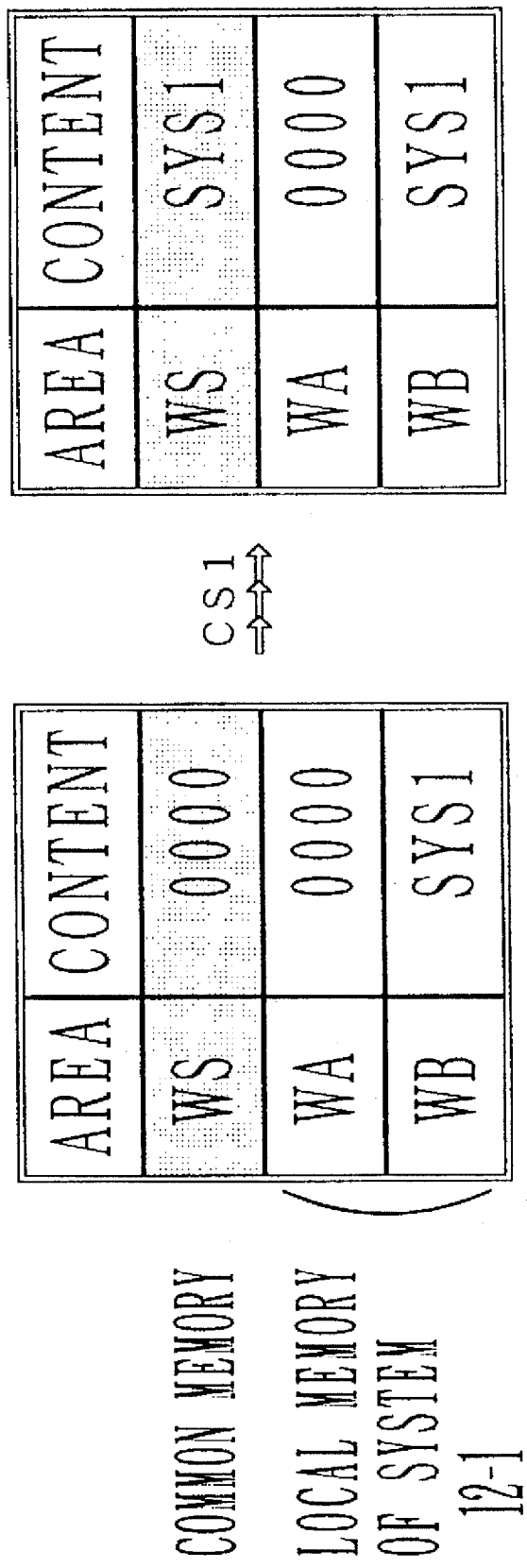
FIG. 10 is a diagram showing a writing operation of a use declaration to a common memory.

Now assume that the control data WS in the common memory is "0000" as shown in FIG. 10, which represents that no use declaration has taken place. When the log writing process 16 of the system 12-1 writes log data to the common memory, "0000" and "SYS1" are written to the areas WA and WB, and the common memory serialization control mechanism 24 executes the CSI shown in FIG. 9. The control data "SYS1" is an identifier of the system 12-1.

At this time, since both the control data WS and WA are "0000" (at step S51), "SYS1" is written to the area of the control data WS (at step S52). The identifier SYS1 written in the area of the control data WS represents a use declaration of the system 12-1. When the use declaration is written to the common memory, the log writing process 16 writes the log data to the common memory.

After the system 12-1 has written the log data, as shown in FIG. 11, the log writing process 16 writes "SYS1" and "0000" to the areas of the control data WA and WB and the serialization control mechanism 24 executes the CSI.

At this time, since both the control data WS and WA are "SYS1" (at step S51), the control data WB, which is "0000", is written into the area of the control data WS (at step S52). In this manner, the use declaration of the common memory by the system 12-1 is discarded.

While the use declaration of the system 12-1 is written in the common memory, the other systems are prohibited from accessing the common memory.

Figure 12:
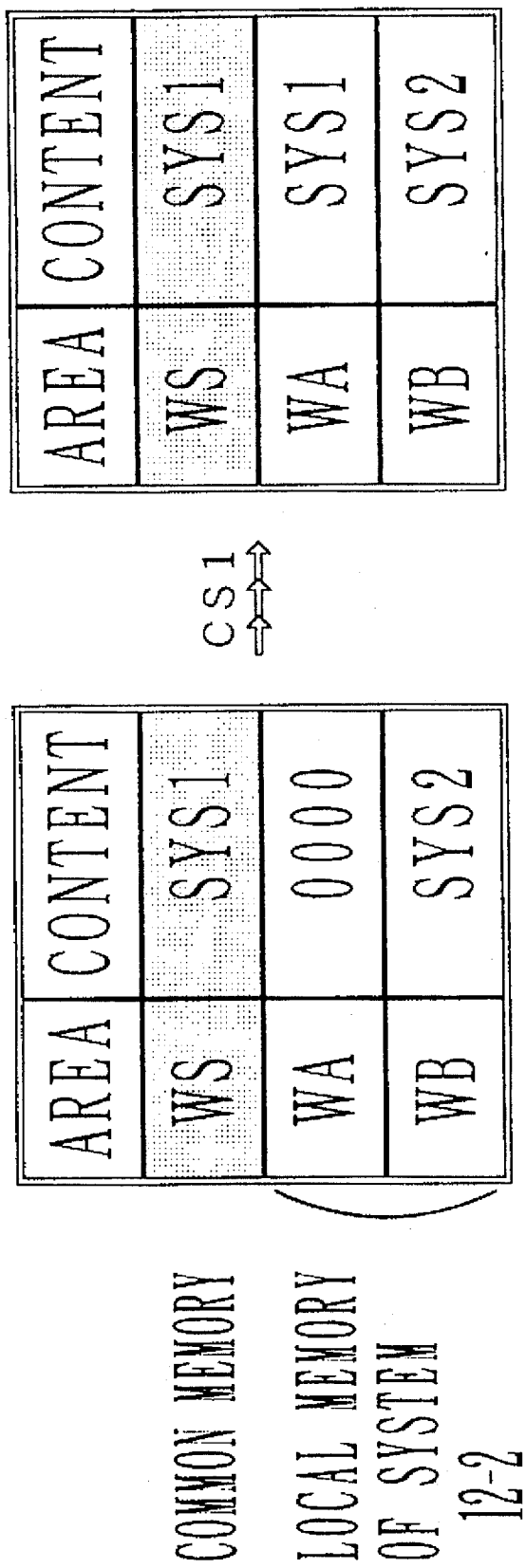
FIG. 12 is a diagram showing an access contention to the common memory according to the present invention.

For example, as shown in FIG. 12, the system 12-2 writes "0000" and "SYS2", which is an identifier of the system 12-2, into the areas of the control data WA and WB and the serialization control mechanism 24 executes the CSI. In this case, the control data WS is "SYS1", whereas the control data WA is "SYS2" (at step S51). Therefore, "SYS1" is written into the area of the control data WA of the system 12-2 (at step S52). Consequently, the system 12-2 acknowledges that the common memory is under a use declaration and waits until the use declaration is discarded.

Thus, with the hardware instruction shown in FIG. 9, access contention for the common memory among a plurality of systems can be controlled.

As is described above, according to the present invention, log data of a plurality of systems are stored in a common memory 10 or a log file 25 shared by the systems in the order of update time of a database 11. With reference to the log data stored in the order of the update time of the database, when a failure takes place in the database, a defective resource can be quickly closed and recovered without the need to change the order of the log data. Thus, unlike with the conventional system, it is not necessary to merge log data gotten from each system. Consequently, when a failure takes place, a defective resource can be recovered immediately while fall-back operation is being performed after a defective resource is closed. In other words, since the database 11 and the log data are shared by a plurality of independent systems, as with TCMP, the log data can be treated and used consistently in a lump in a composite system.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A log data management method including a plurality of database update units, each of said database update units being adapted to access a database through a common bus, exclusively update a resource of said database, and get log data as an update data, said method comprising steps of:

getting said log data; and storing said log data to a non-volatile common area in order of update time of said resource when said resource is released after said resource has been updated, said common area being shared by said database update units.

2. The log data management method as set forth in claim 1, further comprising steps of:

acquiring an exclusive use right of said resource before said resource is updated; and discarding said exclusive use right of said resource after said log data has been stored in said common area.

3. A log data management method including a plurality of database update units, each of said data-base update units being adapted to access a database through a common bus, exclusively update a resource of said database, and get log data as an update data, said method comprising steps of:

getting said log data;

storing said log data to a first common area in order of update time of said resource after said resource has been updated, said first common area being shared by said database update units;

compressing said log data stored in said first common area; and storing the compressed log data to a second common area when said resource is released, said second common area being shared by said database update units and non-volatilizing the compressed log data.

4. The log data management method as set forth in claim 3, further comprising steps of:

acquiring an exclusive use right of said resource before said resource is updated; and discarding said exclusive use right of said resource after said log data has been stored in said second common area.

5. A log data management method including a plurality of database update units, each of database update units being loosely coupled and being adapted to access a database, exclusively update a resource of said database, and get log data as an update data, said method comprising steps of:

getting said log data; and storing said log data to a non-volatile common area in order of update time of said resource when said resource is released after said resource has been updated, said common area being shared by said database update units.

6. A log data management method for recording log data of a database accessed by a plurality of systems, comprising steps of:

getting said log data of said database shared by said systems when said database has been exclusively updated; and writing said log data to a non-volatile common memory in order of update time of said database when said database is released.

7. A log data management method for recording log data of database accessed by a plurality of systems, comprising steps of:

getting log data of said database shared by said systems when said database has been exclusively updated;

writing said log data to a volatile common memory in order of update time of said database;

buffering said log data gotten by said systems in a lump thereby increasing space efficiency; and writing the buffered log data to a non-volatile log file when said database is released.

8. A database recovering method for recovering a defective resource of a database with log data, said log data being gotten as an update data by a plurality of database update units that access said database through a common bus when said database update units exclusively update said resource, said database recovering method comprising steps of:

storing said log data in a non-volatile common area shared by said database update units in order of update time of said resource when said resource is released before a failure takes place in said resource; and recovering said defective resource with said log data stored in said common area when said failure takes place.

9. A computer-readable storage medium, when used by a database processing system including a plurality of computers being adapted to access a database through a common bus, exclusively update a resource of said database and get log data as an update data, used to perform the functions of:

getting said log data; and storing said log data to a non-volatile common area in order to update time of said resource when said resource is released after said resource has been updated, said common area being shared by said computers.

10. A log data management system for use with a database processing system having a plurality of processing units linked by a common bus, said processing units being adapted to exclusively update a resource and to get log data as an update data, said log data management system comprising:

a database for storing said resource; and common memory means of a non-volatile type, for storing said log data obtained by said processing units in order of update time of said resource after said resource has been updated by one of said processing units, said log data being non-volatilized in said common memory means when said resource is released.

11. The log data management system as set forth in claim 10, wherein said common memory means is storing means having a control data area by which accesses from said processing units are controlled.

12. The log data management system as set forth in claim 10, wherein said one of said processing units is adapted not to permit other processing units to use said resource until said log data is stored in said common memory means.

13. A log data management system having a plurality of database update units linked with a database through a common bus, said database update units being adapted to exclusively update a resource of said database and to get log data as an update data, said log data management system comprising:

common memory means of a non-volatile type, linked with said database update units, wherein each of said database update units comprises:

local memory means for storing said log data in order of update time of said resource; and log data transferring means for transferring said log data stored in said local memory means to said common memory means after said resource has been updated, and wherein said common memory means is adapted to store said log data transferred from said database update units in order of update time of said resource in a lump, said log data being non-volatilized in said common memory means when said resource is released.

14. The log data management system as set forth in claim 13, wherein said common memory means is storing means having a control data area by which accesses from said database update units are controlled.

15. The log data management system as set forth in claim 13, wherein each of said database update units is adapted not to permit other database update units to use said resource until said log data is stored in said common memory means.

16. A log data management system for use with a database processing system having a plurality of database update units linked with a database through a common bus, said database update units being adapted to exclusively update a resource of said database and to get log data as an update data, said log data management system comprising:

common memory means for compressing and storing said log data gotten by said database update units in order to update time of said resource after said resource has been updated by one of said database update units; and log non-volatilizing means for non-volatilizing said log data stored in said common memory means when said resource is released.

17. The log data management system as set forth in claim 16, wherein said common memory means is volatile storing means, and wherein said log non-volatilizing means is non-volatile storing means linked with said common bus.

18. The log data management system as set forth in claim 16, wherein said one of said database update units is adapted not to permit other database update units to use said resource until said log data is non-volatilized by said log non-volatilizing means.

19. A log data management system having a plurality of database update units linked with a database through a common bus, said database update units being adapted to exclusively update a resource of said database and to get log data as an update data, said log data management system comprising:

common memory means linked with said database update units; and log non-volatilizing means linked with said database update units, wherein each of said database update units comprises:

local memory means for storing said log data in order to update time of said resource; and log data transferring means for transferring said log data stored in said local memory means to said common memory means after said resource has been updated, wherein said common memory means is adapted to compress and store said log data transferred from said database update units in order of update time of said resource in a lump, and wherein said lot non-volatilizing means is adapted to non-volatilize said log data stored in said common memory means when said resource is released.

20. The log data management system as set forth in claim 19, wherein said common memory means is volatile storing means, and wherein said log non-volatilizing means is non-volatile storing means linked with said common bus.

21. The log data management system as set forth in claim 19, wherein each of said database update units is adapted not to permit other database update units to use said resource until said log data is non-volatilized by said log non-volatilizing means.

22. A database update unit for use in a database processing system having a plurality of database update units linked with a database through a common bus, said database update units being adapted to exclusively update a resource of said database and to get log data as an update data, said database update unit comprising:

local memory means for storing said log data in order of update time of said resource; and log data transferring means for transferring said log data stored in said local memory means to a common memory linked with said database update units, said common memory being adapted to store said log data transferred from said data database update units in order of update time of said resource in a lump, said log data being non-volatilized in said common memory when said resource is released.

23. The database update unit as set forth in claim 22, further comprising:

control means for controlling contention with other database update units, said contention taking place when said log data transferring means transfers said log data to said common memory.

24. A database update unit for use in a database processing system having a plurality of database update units linked with a database through a common bus, said database update units being adapted to exclusively update a resource of said database and to get log data as an update data, said database update unit comprising:

local memory means for storing said log data in order of update time of said resource; and log data transferring means for transferring said log data stored in said local memory means to a common memory linked with said database update units, said common memory compressing and storing said log data in order of update time of said resource, and for storing the compressed log data in a log non-volatilizing area when said resource is released.

25. The database update unit as set forth in claim 24, further comprising:

control means for controlling contention with other database update units, said contention taking place when said log data transferring means transfers said log data to said common memory.

26. A log data management system having a plurality of database update units linked with a database through a common bus, a transaction taking place in said database update units, said transaction being adapted to update a resource of said database and to record log data as an update record, said log data management system comprising:

common memory means of a non-volatile type, linked with said database update units, wherein each of said database update units comprises:
exclusion control means for allowing said transaction to exclusively use said resource;
log data getting means for allowing said transaction to get said log data in order of update time of said resource; and
log writing means for writing said log data to said common memory after said resource has been updated, and wherein said exclusion control means is adapted to allow another transaction to use said resource after said log writing means has written said log data to said common memory means.

27. A log data management system having a plurality of database update units linked with a database through a common bus, a transaction taking place in said database update units, said transaction being adapted to update a resource of said database and to record log data as an update record, said log data management system comprising:

common memory means linked with said database update units, wherein each of said database update units comprises:
exclusion control means for allowing said transaction to exclusively use said resource;
log data getting means for allowing said transaction to get said log data in order to update time of said resource;
log writing means for writing said log data to said common memory after said resource has been updated; and
log non-volatilizing means linked with said database update units and adapted to non-volatilize said log data, wherein said common memory means is adapted to compress said log data, and wherein said log writing means is adapted to write the compressed log data to said log non-volatilizing means, and wherein said exclusion control means is adapted to allow another transaction to use said resource after said log writing means has written said log data to said log non-volatilizing means.

28. A log data management system for use with a loosely coupled database processing system having a plurality of processing units, each of said processing units being adapted to exclusively update a resource and get log data as an update data, said log data management system comprising:

a database for storing said resource; and common memory means of a non-volatile type, for storing said log data gotten by said processing units in order of update time of said resource after said resource has been updated by one of said processing units, said log data being non-volatilized in said common memory means when said resource is released.

29. A log data management system for use with a loosely coupled database processing system having a plurality of database update units linked with a database, each of said database update units being adapted to exclusively update a resource of said database and get log data as an update data, said log data management system comprising:

common memory means for compressing and storing said log data gotten by said database update units in order of update time of said resource after said resource has been updated by one of said database update units; and log non-volatilizing means for non-volatilizing said log data stored in said common memory means when said resource is released.

30. A database update unit for use in a loosely coupled database processing system having a plurality of database update units linked with a database, each of said database update units being adapted to exclusively update a resource of said database and get log data as an update data, said database update unit comprising:

local inemory means for storing said log data in order of update time of said resource when said resource is updated; and log data transferring means for transferring said log data stored in said local memory means to a common memory linked with said database update units, said common memory being adapted to store said log data transferred from said database update units in order of update time of said resource in a lump, said log data being non-volatilized in said common memory when said resource is released.

31. A database update unit for use in a loosely coupled database processing system having a plurality of database update units linked with a database, each of said database update units being adapted to exclusively update a resource of said database and get log data as an update data, said database update unit comprising:

local memory means for storing said log data in order of update time of said resource when said resource is updated; and log data transferring means for transferring said log data stored in said local memory means to a common memory linked with said database update units, said common memory compressing and storing said log data in said common memory in order of update time of said resource, and for storing the compressed log data to a log non-volatilizing area when said resource is released.

32. A database recovering system for recovering a failure of a database with log data, said log data being gotten as an update data by a plurality of database update units linked with said database through a common bus when a resource of said database is exclusively updated by said database update units, said database recovering system comprising:

common memory means of a non-volatile type, linked with said database update units and for storing said log data gotten by said database update units in order of update time of said resource before said failure takes place, said log data being non-volatilized in said common memory means when said resource is released; and recovering means for recovering said resource with said log data stored in said common memory means when said defect takes place in said resource.

* * * * *